(12) United States Patent
Bianchi (10) Patent No.: US 6,712,271 B2
(45) Date of Patent: Mar. 30, 2004

(54) DEVICE AND METHOD FOR READING CODED INFORMATION, AND DEVICE FOR DETECTING A LUMINOUS SIGNAL DIFFUSED BY A SUPPORT CONTAINING CODED INFORMATION

(75) Inventor: Maurizio Bianchi, Bologna (IT)

(73) Assignee: Datalogic S.P.A., Bologna (IT)

( * ) Notice: Subject to any disclaimer, the term of this patent is extended or adjusted under 35 U.S.C. 154(b) by 65 days.

(21) Appl. No.: 09/785,539

(22) Filed: Feb. 20, 2001

(65) Prior Publication Data

US 2002/0056754 A1 May 16, 2002

(30) Foreign Application Priority Data

Nov. 10, 2000 (EP) .............................................. 00830743

(51) Int. Cl.⁷ ................................................. G06K 7/10
(52) U.S. Cl. ............................ 235/462.25; 235/462.16; 235/462.41
(58) Field of Search ........................ 235/462.25, 462.16, 235/462.41

(56) References Cited

U.S. PATENT DOCUMENTS

| | | | | |
|---|---|---|---|---|
| 3,893,062 A | * | 7/1975 | Segui | .......................... 367/134 |
| 3,949,233 A | | 4/1976 | Gluck | |
| 4,792,666 A | | 12/1988 | Cherry et al. | |
| 5,382,782 A | | 1/1995 | Hasegawa et al. | |
| 5,723,868 A | * | 3/1998 | Hammond et al. | ......... 250/553 |
| 6,119,071 A | * | 9/2000 | Gorenflo et al. | ............... 702/85 |
| 6,202,928 B1 | * | 3/2001 | Boersma | ................... 235/462.1 |
| 6,348,773 B1 | * | 2/2002 | Dvorkis et al. | ............. 318/685 |
| 6,386,454 B2 | * | 5/2002 | Hecht et al. | ........... 235/462.16 |
| 6,435,412 B2 | * | 8/2002 | Tsi et al. | ................ 235/462.41 |

* cited by examiner

Primary Examiner—Thien M. Le
Assistant Examiner—Allyson Sanders
(74) Attorney, Agent, or Firm—Nixon & Vanderhye, P.C.

(57) ABSTRACT

The invention relates to a device for reading coded information, comprising illumination means, means for picking-up a luminous signal diffused by an illuminated support containing coded information, means for detecting the luminous signal intended to generate an electrical signal that is proportional to said luminous signal (for example, an electrical signal with an amplitude variable, along at least one reading direction, between at least one maximum value Vmax and at least one minimum value Vmin), and means for processing said electrical signal, intended to extract the information content from it. The device further comprises means for varying, preferably point by point, the amplitude pattern of said electrical signal along said at least one reading direction so as to generate an electrical signal having a predetermined amplitude pattern, for example, substantially constant. Preferably, said means for varying the amplitude pattern of said first electrical signal comprises amplifying means with a gain variable according to a variation law substantially inverse with respect to the variation law of said first electrical signal. At each scan, such device compensates the typical amplitude variations of the detected electrical signal, caused by the intrinsic operation characteristic of the illumination and detection means, thus increasing the reliability of the performed reading.

32 Claims, 5 Drawing Sheets

DEVICE AND METHOD FOR READING CODED INFORMATION, AND DEVICE FOR DETECTING A LUMINOUS SIGNAL DIFFUSED BY A SUPPORT CONTAINING CODED INFORMATION

BACKGROUND

I. Field of the Invention

The present invention relates to a device and a method for reading coded information. The invention also relates to a device for detecting a luminous signal diffused by a support containing coded information.

II. Related Art and Other Considerations

As known, coded information readers (for example, optical readers) capable of locating and decoding the information contained on a support (for example, an optical code associated to an object) which is into a predetermined reading area have been launched on the market in recent years.

In this description and following claims, the expression "coded information reader" refers to any device capable of acquiring information relating to an object (for example distance, volume, size, or its identification data) through the acquisition and processing of a luminous signal diffused by the same object. The expression "coded information" refers to all identification data contained in an optical code. The expression "optical code" refers to any graphic representation having the function of storing a coded information. A particular example of optical code comprises linear or two-dimensional codes wherein the information is coded through suitable combinations of elements having predetermined shape, such as for example squares, rectangles or hexagons, dark-colored (usually black), separate by light elements (spaces, usually white) such as bar codes, stacked codes, and two-dimensional codes in general, color codes, etc. Moreover, the expression "optical code" comprises, more in general, also other graphic patterns having function of coding the information, including light printed characters (leffers, numbers, etc.) and particular patterns (such as for example stamps, logos, signatures, digital fingerprints, etc.). The expression "optical code" also comprises graphic representations detectable not only in the field of visible light but also in the wavelength range comprised between infrared and ultraviolet.

Only by way of example, and for the purpose of making the following description clearer, explicit reference shall be made to a linear optical code reader (linear reader). Of course, a man skilled in the art shall understand that what said is also applicable to different readers, such as for example two-dimensional optical code readers (matrix or area readers).

Typically, optical code readers comprise an illumination system intended to emit a luminous signal towards the support containing the coded information to be read (optical code) and a reception system intended to pick-up the luminous signal diffused by the illuminated optical code. In particular, said luminous signal is picked up on suitable photo-receiving means (or means for detecting the luminous signal diffused by the illuminated optical code and picked-up through the optical reception system), which in turn generates an electrical signal proportional to the picked-up luminous signal; the electrical signal is intended to be afterwards elaborated and/or processed and decoded, so as to extract the information content.

In a typical embodiment of a conventional linear optical reader, the illumination system comprises an array of LEDs (or more arrays, in matrix or area readers), optionally followed by one or more diaphragms and one or more focalization lenses. Each one of the LEDs of the above mentioned array generates a light beam having a variable luminosity, with a maximum value at the LED optical emission axis, and with decreasing values as the emission angle increases. LEDs are typically aligned so as to be equidistant and parallel to one another and to the reader optical axis. In this way, the light beam exiting from the reader has a luminosity which is variable along the LED alignment direction, with a pattern that is function of the contribution of each LED, of the position of the LED with respect to the reader optical axis, and of the distance of the reader from the illuminated optical code. In fact, it has been noted that, for relatively small distances between reader and code, the profile of the luminous emission beam is not very even along the LED alignment direction and it is possible to distinguish in the profile, at local peaks, the contribution of each LED. As the distance between reader and code increases, besides the decrease of the luminous intensity of the light emission beam, said profile becomes more and more even, and the contribution of each LED becomes less and less clear; said pattern is an intrinsic operation feature of the optical illumination system described above.

The reception system typically comprises one or more lenses and/or diaphragms intended to pick-up, on the photo-receiving means, the light beam diffused by the illuminated code. The system exhibits the feature of transmitting light in a quantitatively different manner depending on whether the light passes through it in the axis, or at the margins of the field of view. In particular, the power per area unit of the luminous beam diffused by the illuminated code and picked-up by the above lenses and/or diaphragms on the photo-receiving means progressively decreases from the center towards the edges of the same beam. This pattern is an intrinsic operation feature of the optical reception system described above.

The photo-receiving means typically comprises an array of photosensitive elements arranged on one (CCD or C-MOS linear sensors) or more parallel lines (CCD or C-MOS matrix sensors). Each photosensitive element is adapted to detect the light portion diffused by a corresponding portion of the illuminated optical code.

From the above, it can be deduced that the illumination and reception systems described above exhibit the similar feature of attenuating the power per area unit of the luminous beam (respectively, of emission and reception) at the margins of their field of view, thus producing a cumulative effect which accentuates the luminous unevenness between the central portion and the margins of the light beam picked-up on the photo-receiving or sensor means. As a consequence, the photosensitive elements at the ends of the sensor (hit by the light coming from the areas at the edges of the optical code) receive less light than those arranged centrally. Since the electrical signal generated by the sensor is proportional to the quantity of light received by the various photosensitive elements, it shall thus have a different pattern in amplitude depending on the distance from the sensor optical axis. This may cause significant problems for the correct operation of the optical reader and, consequently, for the reliability of the reading performed by it. In fact, it would be desirable to obtain, in output from the sensor, an electrical signal with substantially constant amplitude, so as to ensure high precision and reliability standards in the subsequent optical code digitalization and decoding operations.

For the purpose of reducing the undesired effect of attenuation of the power per area unit of the luminous beam hitting on the photosensitive elements of the sensor depending on the distance from the optical axis of the same, various structural solutions have been identified, which have already been used in conventional optical readers. For example, one of said solutions consists in using an illumination system wherein the various emission LEDs are arranged at a non-constant reciprocal distance, and/or with a reciprocal angle. Another solution consists in using a system for controlling the emission LEDs, intended to control the various LEDs in a differentiated way, so as to evenly illuminate the code at the edges as well as at the centre, or illuminate it more at the edges with respect to the centre, so as to compensate the loss of light at the edges caused by the optical reception system.

Thus, in the various structural solutions described above, the drawback mentioned above is at least partly overcome by structurally intervening on (or upstream of) the reader optical illumination system. However, although advantageous for obtaining the expected purposes, such solutions require an ad hoc design of the reader illumination and reception systems (that is, the implementation of a series of structural details in said systems is required) depending on the type of use provided for the reader (in particular, depending on the type of code to be read, the expected distance between reader and code and/or the reader depth of field), thus limiting the possibility of using them for a different use from what they have been designed for. Moreover, such readers are relatively complex from a construction point of view, and this unavoidably affects the production and/or sale cost of the same negatively.

The technical problem at the basis of the present invention is that of identifying a new structural solution which renders feasible, downstream of the sensor, an electrical signal having—along a predetermined reading direction—any desired and predetermined amplitude pattern. More particularly, an object of the present invention is determining an alternative solution to the known ones, so as to overcome the drawback correlated to the attenuation of the power per area unit of the luminous beam on the photosensitive elements of the sensor when the distance from the optical axis of the same changes (so as to guarantee a correct operation and high reliability of the reader), concurrently overcoming the drawbacks of the solutions used in the prior art, in particular those relating to the critical implementation of the illumination and reception systems of the reader depending on the type of expected use.

SUMMARY

Thus, in a first aspect thereof, the present invention relates to a device for reading coded information, comprising:
  illumination means;
  means for picking up a luminous signal diffused by an illuminated support containing coded information;
  means for detecting the luminous signal, intended to generate a first electrical signal proportional to said luminous signal;
  means for processing said first electrical signal, intended to extract the coded information content from it; characterised in that it comprises means for varying the amplitude pattern of said first electrical signal along at least one reading direction, so as to generate an electrical signal having, along said reading direction, a predetermined amplitude pattern.

Advantageously, through the device of the present invention it is possible to obtain, downstream of the optical reception path, an electrical signal having, along a reading direction, any desired and/or predetermined amplitude pattern. This is advantageously obtained by suitably varying the amplitude of the electrical signal detected by the photo-receiving means (or detection means, or sensor). In particular, the knowledge of the variation law of the amplitude of the detected electrical signal (which is known in advance, or detectable in output from the sensor) is used to generate, at each scan, a control signal intended to vary the amplitude pattern of the detected electrical signal, so as to generate a resulting signal (in the following description, also referred to as "compensated" electrical signal) having a desired and predetermined amplitude pattern.

In this description and in the following claims, the expression "resulting (or compensated) electrical signal", refers to an electrical signal wherein the amplitude pattern, along a reading direction, has been varied (through the application of a suitable control signal) so as to assume a predetermined pattern. For example, according to the present invention, the resulting (or compensated) electrical signal can be a signal having a substantially constant amplitude pattern (obtained starting from a detected electrical signal having a variable amplitude), or an electrical signal having an amplitude pattern variable according to a second variation law, for example with a greater amplitude at the ends (obtained starting from a detected electrical signal having a constant amplitude or an amplitude variable according to a first variation law—for example, having greater amplitude at the centre), etc.

Advantageously, the device of the present invention has a preferred application in those cases in which the electrical signal detected by the photo-receiving means has an amplitude variable, along said at least one reading direction, between at least one maximum value Vmax and at least one minimum value Vmin; in these cases, the means for varying the amplitude pattern of said first electrical signal along said at least one reading direction are, preferably, such as to generate an electrical signal with substantially constant amplitude.

According to the present invention, and unlike the technical solutions described above with reference to the prior art, the drawback correlated to the attenuation of the power per area unit of the luminous beam hitting on the photosensitive elements of the sensor when the distance from the optical axis of the same varies, is advantageously overcome by intervening downstream of the optical reception system of the luminous signal diffused by the illuminated optical code; in particular, said intervention consists in varying the amplitude pattern of the electrical signal detected by the photo-receiving means (or detection means or sensor). Advantageously, this allows to release from the critical implementation of the illumination and reception systems used, as in this case no ad hoc design of said systems is required depending on the expected use of the reader.

In fact, the present invention is based on the fact of assuming the variable pattern of the amplitude of the detected electrical signal (caused by the variation of the power per area unit of the luminous beam diffused by the illuminated optical code) as it is, irrespective of the structural peculiarities of the illumination and reception system used in the device of the invention. In particular, the knowledge of the variation law of the amplitude of the detected electrical signal (known in advance or detectable in output from the sensor) is used to generate, at each scan, a control signal adapted to vary the amplitude pattern of the detected electrical signal, so as to generate an electrical signal having—along the reading line—a predetermined amplitude pattern, in particular a substantially constant amplitude pattern.

Preferably, the means for varying the amplitude pattern of said first electrical signal operates on said first electrical signal point by point. That is to say, a point by point variation of the detected electrical signal is advantageously carried out; this is particularly advantageous for obtaining a signal having a substantially constant amplitude.

Typically, the illumination means comprises at least one array of LEDs intended to generate a luminous signal. On the other hand, the means for detecting the luminous signal comprises at least one array of photosensitive elements aligned along said at least one reading direction. Preferably, the detection means comprises a CCD or C-MOS, linear or matrix sensor.

Preferably, the means for varying the amplitude pattern of said first electrical signal comprises amplifying means with a gain variable according to a predetermined variation law. Even more preferably, the means for varying the amplitude pattern of said first electrical signal comprises amplifying means with a gain variable according to a variation law which is substantially inverse with respect to the variation law of said first electrical signal (which, as already mentioned, is known in advance or can be detected in output from the sensor) and such as to apply a gain Gmin with value equal to 1 to points of said first electrical signal having maximum amplitude Vmax and a gain Gmax with value equal to Vmax/Vmin to points of said first electrical signal having minimum amplitude Vmin. Advantageously, this allows to obtain, downstream of the optical reception path, an electrical signal with a constant amplitude, equal to Vmax.

Of course, the closer the gain variation law applied to the detected electrical signal is to the inverse of the amplitude pattern of said signal, the more constant is the amplitude pattern of the resulting (or compensated) electrical signal; as a consequence, the subsequent operations of digitalisation and optionally decoding of the optical code will be more precise and reliable. For the purpose of guaranteeing a minimum difference between the gain pattern applied to the detected electrical signal and the inverse of the amplitude pattern of said signal, some criteria (hereinafter called compensation criteria) have been devised, which shall be described in detail in the following of the present description.

Preferably, the device of the invention further comprises means for controlling said variable gain amplifying means. Even more preferably, according to an embodiment of the device of the present invention, said controlling means comprises:

means for generating at least one second electrical signal variable according to an inverse variation law with respect to that of at least one third electrical signal representative of a luminous signal diffused by a reference target placed on at least one predetermined distance;

means for synchronising said at least one second electrical signal with said first electrical signal.

Preferably, said reference target is a white-coloured plane support. In fact, such a target has features that are assimilable to those of a white paper sheet, which is the most common support for printing optical codes. Said target thus ideally represents the plane on which, in the normal operation of the reader, the optical code to be read shall lie. Thus, the electrical signal generated by the sensor in these operating conditions shall contain the characteristic effect of the attenuation of luminosity at the edges of the field of view of the used illumination and reception optical systems. By inverting the pattern of said signal it is obtained how the gain must vary within the scan in order to make effective the intervention of varying the amplitude pattern of the detected signal.

In a preferred embodiment of the device of the present invention, said at least one third signal is representative of the mean of the electrical signals detected, when placing the reference target at different distances. The number of detections carried out at different distances is advantageously defined on the basis of merit evaluations relating to the distance between target and reader, the type of application required for the reader, the heterogeneity of the patterns of the electrical signal detected at the various distances, etc.

In a second aspect thereof, the present invention relates to a device for detecting a luminous signal diffused by a support containing coded information, comprising photo-receiving means intended to generate a first electrical signal proportional to a luminous signal diffused by a support containing coded information, characterised in that it comprises means for varying the amplitude pattern, along at least one reading direction, of said first electrical signal, so as to generate an electrical signal having, along said reading direction, a predetermined amplitude pattern, for example a substantially constant amplitude. Such a device allows to obtain all the advantages mentioned above with reference to the reading device of the present invention, and it is adapted to be used in such reading device.

In a third aspect thereof, the invention relates to a method for reading coded information, comprising the following steps:

illuminating a support containing coded information;
picking-up a luminous signal diffused by said illuminated support;
detecting said luminous signal so as to generate a first electrical signal proportional to said luminous signal;
processing said first electrical signal so as to extract the coded information content from it;

characterised in that it comprises the step of varying the amplitude pattern of said first electrical signal along at least one reading direction, so as to generate an electrical signal having, along said reading direction, a predetermined amplitude pattern.

Such a method can advantageously be implemented through the reading device of the present invention and allows to obtain all the advantages mentioned above.

In particular, advantageously, the method of the present invention has a preferred implementation in those cases in which the electrical signal detected by the photo-receiving means has an amplitude which is variable, along said at least one reading direction, between at least one maximum value Vmax and at least one minimum value Vmin; in these cases, the variation of the amplitude pattern of said electrical signal detected along said at least one reading direction is preferably such as to generate an electrical signal with a substantially constant amplitude. In particular, the method of the invention allows to eliminate the phenomenon of attenuation of the power per area unit of the luminous beam hitting on the photosensitive elements of the sensor when the distance from the optical axis of the same varies, thus guaranteeing highly reliable reads.

Preferably, the variation of the amplitude pattern of said first electrical signal occurs point by point.

Preferably, the step of varying the amplitude pattern of said first electrical signal comprises the step of amplifying said first electrical signal by applying thereto a gain variable according to a predetermined variation law. Even more preferably, the step of varying the amplitude pattern of said first electrical signal comprises the step of amplifying said first electrical signal by applying thereto a gain variable according to a variation law which is substantially inverse with respect to that of said first electrical signal.

Preferably, the step of amplifying said first electrical signal comprises the step of applying a gain Gmin with a value equal to 1 to points of said first electrical signal having maximum amplitude Vmax and a gain Gmax with a value equal to Vmax/Vmin to points of said first electrical signal having minimum amplitude Vmin.

In a first embodiment of the method of the present invention, the step of amplifying said first electrical signal comprises the following steps:

generating at least one second electrical signal variable according to a variation law that is inverse with respect to that of at least one third electrical signal representative of at least one luminous signal diffused by a reference target placed on least at one predetermined distance;

synchronising said at least one second electrical signal with said first electrical signal;

adjusting said gain depending on said at least one second electrical signal.

Preferably, the step of generating said at least one second electrical signal comprises the following steps:

detecting a third signal representative of a luminous signal diffused by an illuminated reference target placed at a predetermined distance;

repeating the previous step for a predetermined number of times, each time varying the distance at which the reference target is placed;

determining at least one fourth electrical signal representative of the electrical signals detected by placing the reference target at different distances;

determining at least one second electrical signal having an inverse variation law with respect to that of said at least one fourth electrical signal.

Preferably, said reference target is a white-coloured plane support.

In an alternative embodiment thereof, the method of the present invention further comprises the steps of carrying out a plurality of consecutive detections, each time amplifying the detected electrical signal by applying thereto a gain variable according to a predetermined variation law, for example an inverse law with respect to that of the previously detected signal.

BRIEF DESCRIPTION OF THE DRAWINGS

Further features and advantages of the present invention will appear more clearly from the following detailed description of a preferred embodiment, made with reference to the attached drawings. In such drawings.

DETAILED DESCRIPTION

Figure 1:
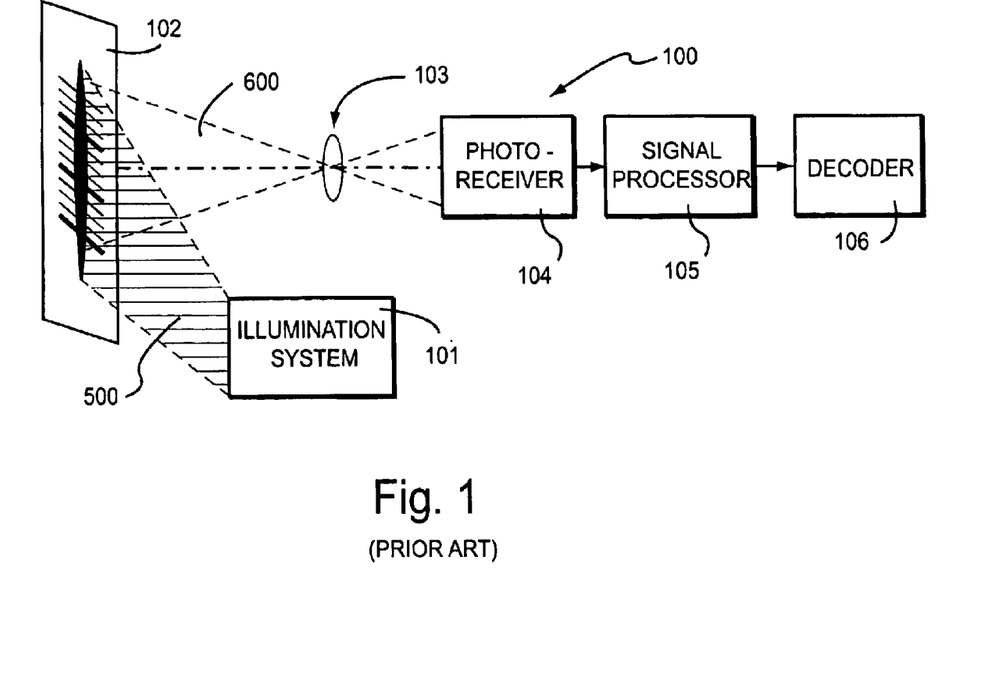
FIG. 1 shows a block diagram of a conventional optical reader for bar codes.

For the purpose of making clearer the description of the reader and/or detection device of the present invention, as well as the differences with the readers and/or detection devices of the prior art, reference shall be first made to FIG. 1, which shows an optical code reader 100 of the conventional type (PRIOR ART).

Typically, a reader of the conventional type comprises an illumination system 101 intended to emit a light beam 500 towards a support 102 containing the coded information to be read (in the specific case, a bar code) and a reception system 103, intended to pick-up the light beam 600 diffused by the illuminated code. In particular, said light beam 600 is picked-up on suitable photo-receiving means (or sensor) 104, which in turn generates an electrical signal proportional to the picked-up luminous signal. Afterwards, the electrical signal is elaborated and/or processed through suitable processing means 105 and finally decoded through suitable decoding means 106, so as to extract the information content.

Figure 2:
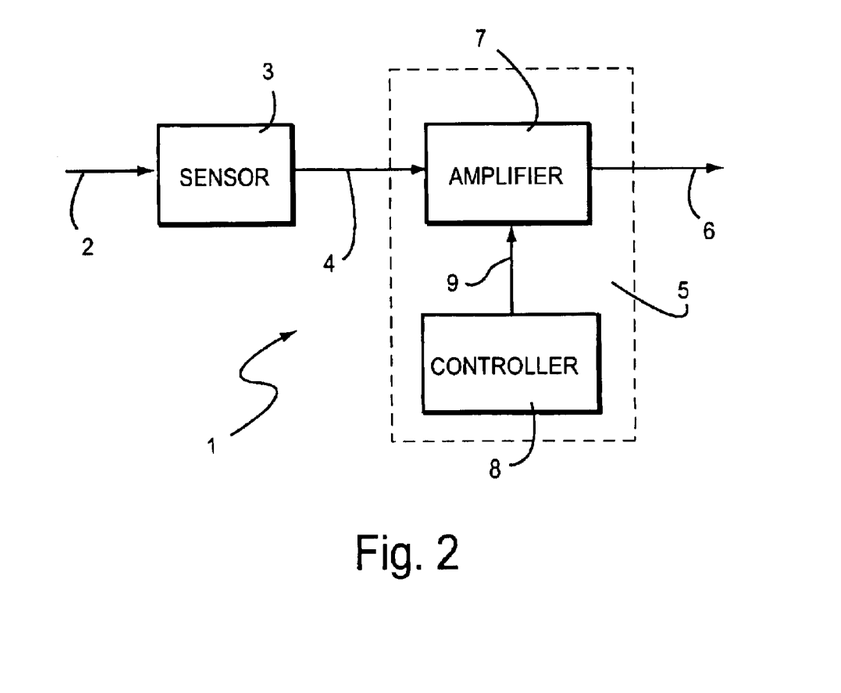
FIG. 2 shows a block diagram of a device for detecting a luminous signal diffused by an illuminated optical code, according to the present invention.

Reference shall now be made to FIG. 2, which shows a device 1 for detecting a luminous signal 2 generated by an illuminated support containing coded information (optical code), according to the present invention.

Device 1 is intended to be used in a modified optical code reader, in addition to the conventional photo-receiving means 104. Such reader is an example of a device for reading coded information (optical code reader) according to the present invention.

Such reader comprises an illumination system (not shown) in se conventional (that is, comprising an array of LEDs, optionally followed by one or more diaphragms and one or more focusing lenses), intended to illuminate the optical code to be read. The reader further comprises a system (in se conventional as well) for receiving and/or picking-up a luminous signal 2 diffused by the illuminated optical code and, downstream of the latter, in the optical reception path, a detection device 1 according to the present invention.

Downstream of the detection device 1, the reader further comprises conventional means (not shown) for elaborating and decoding the detected electrical signal so as to extract the information content from it.

As shown in FIG. 2, the detection device 1 of the invention comprises a sensor 3 of the conventional type, including an array of photosensitive elements arranged on a line (CCD or C-MOS linear sensors) or more lines (CCD or C-MOS matrix sensors) that is/are parallel to a predetermined reading or scan direction of the code. The sensor is intended to generate an electrical signal 4 proportional to the luminous signal 2 diffused by the illuminated optical code (and picked-up through the optical reception system). For example, the electrical signal 4 is a signal with an amplitude variable, along the above reading direction, between a maximum value Vmax and a minimum value Vmin (depending on the luminosity variation of the luminous signal 2 diffused by the illuminated optical code).

Operatively associated to sensor 3 there is provided, in device 1 of the invention, means 5 (e.g., an amplitude modulator or an analog or digital processor) for varying point by point the amplitude pattern of the electrical signal 4 along the above reading direction. so as to generate a resulting electrical signal 6 having predetermined amplitude, preferably a substantially constant amplitude. While means 5 is shown in FIG. 2 directly at the output from sensor 3; actually it can be arranged in different points (more downstream) in the signal processing chain of the reader of the invention, on condition that it is always operatively associated to the sensor 3 (for example, after a buffer, a pre-amplifier, a filtering system, etc.)

In turn, means 5 comprises amplifying means 7 with a gain variable according to a variation law generating a desired and/or predetermined signal amplitude pattern, preferably according to a law which is substantially inverse with respect to the variation law of the electrical signal 4. Moreover, means 5 comprises means 8 for controlling the amplifying means 7.

The controlling means 8 produces a control signal 9 containing the information on how the gain of the amplifying means 7 must vary within the scan to carry out the amplitude variation of the electrical signal 4 detected by sensor 3, so as to generate a resulting electrical signal 6 having a predetermined amplitude, preferably constant. For example, according to an embodiment of device 1 of the invention, the amplifying means 7 can be controlled, through the control signal 9, so as to apply a gain Gmin with a value equal to 1 to points of the electrical signal 4 having maximum amplitude Vmax, a gain Gmax with a value equal to Vmax/Vmin to points of the electrical signal 4 having minimum amplitude Vmin, and a substantially inverse gain variation law with respect to the variation law of the electrical signal 4 to all of the other points of the electrical signal 4 whose amplitude values are comprised between Vmax and Vmin. By doing so, a resulting electrical signal 6 is obtained downstream of sensor 3, having desired and/or predetermined amplitude, in particular with a constant amplitude equal to Vmax.

The closer the gain variation law applied to the detected electrical signal 4 is to the inverse of the amplitude pattern of said signal, the more constant is the amplitude pattern of the resulting electrical signal 6 after having carried out the intervention of varying the amplitude pattern. As a consequence, the following operations of digitalization and optionally decoding of the optical code will be more precise and reliable.

As already mentioned, for the purpose of guaranteeing a minimum difference between the gain pattern applied to the detected electrical signal 4 and the inverse of the amplitude pattern of such signal, the inventors have devised some compensation criteria which shall be described in detail in the following present description. In fact, although it is possible to calculate—when the distance varies—the illumination profile pattern of a typical illumination system consisting of equal luminous sources (LED), arranged in a row and equidistant from one another, on a plane target arranged in front of them in a perpendicular position with respect to their symmetry axis, and although the luminous profile pattern picked-up through the optical reception system on the photo-receiving means is known (or detectable), the distance from the optical code at which the reader shall be arranged by the user during operation, and its inclination, are not predictable in advance. Advantageously, the compensation criteria described below take into consideration the different operating conditions of the reader.

According to one of the criteria, a reference target is realized, comprising a white-coloured plane support whose features are assimilable to those of a white paper sheet, which is the most common support for printing optical codes. The target thus realized ideally represents the plane in the space on which, in the normal operation of the reader, the optical code to be read shall lie. Thus, the electrical signal 4 generated by sensor 3 in these operating conditions shall contain the characteristic effect of the luminosity attenuation of the used reception and illumination optical systems. By inverting the pattern of such signal, it is determined how the gain must vary within the scan in order to make effective the intervention of varying the amplitude pattern of the electrical signal 4.

More preferably, the above step of detecting the luminous signal 2 diffused by the illuminated target is repeated for a predetermined number of times, each time varying the distance between target and reader. The number of such times can be defined on the basis of merit evaluations relating to the reading depth of field of the reader, the heterogeneity of the luminous patterns at the various distances, the type of application required for the reader, etc. After having carried out all the detections, it is determined which pattern among the detected ones may be the pattern of a mean or most typical electrical signal (by defining a mean or most typical value of the Vmax/Vmin ratio which should meet the operative requirements of the reader, or by obtaining the variation pattern of the signal, in its becoming between the values Vmax and Vmin, which should meet the operative requirements of the reader).

From the structural point of view, the criterion described above can be implemented by various alternative embodiments of the controlling means 8 for the amplifying means 7.

Figure 6:
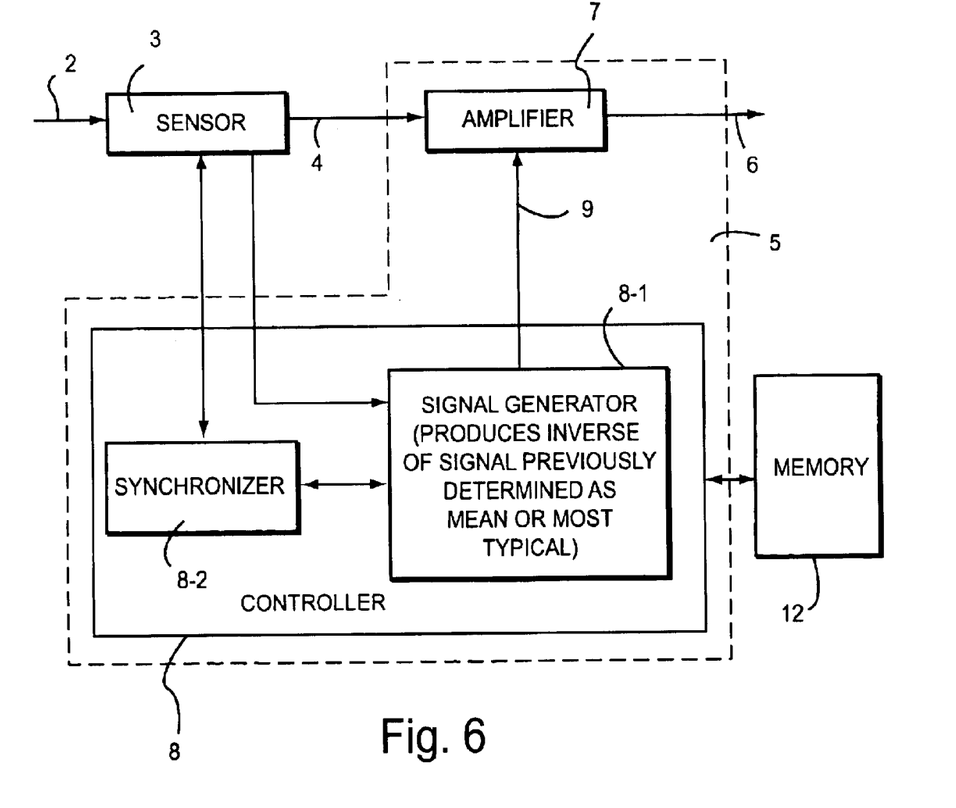

According to a first embodiment shown in FIG. 6, the controlling means 8-1 comprises a signal generator 8 which analogically reproduces, within each scan, the inverse pattern of the signal previously determined as the mean or the most typical signal, and a synchroniser 8-2 or timer, intended to synchronize the signal generator 8-1 with sensor 3. At each scan, the signal generator 8-1 controls, through the control signal 9, the gain of the amplifying means 7, thus generating a resulting electrical signal 6 having a substantially constant amplitude.

Figure 3:
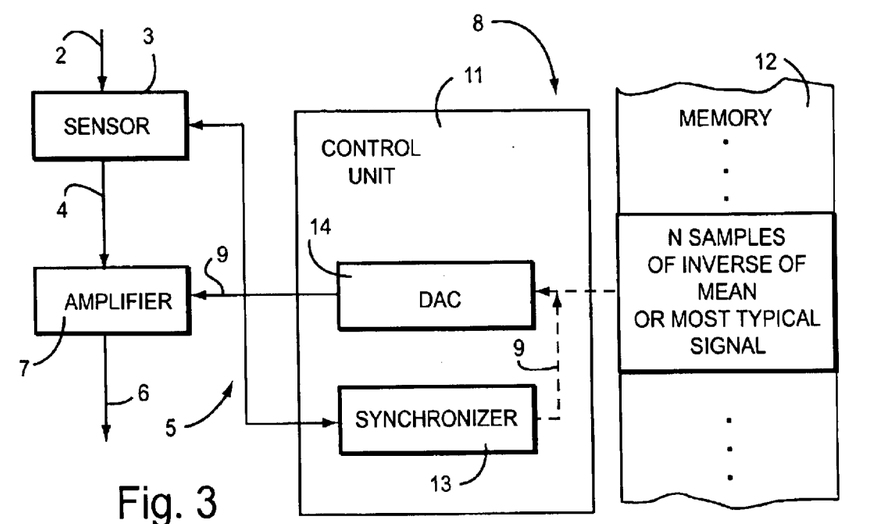
FIG. 3 shows a block diagram of an embodiment of a portion of a reading device according to the present invention, including the device of FIG. 2.

According to an alternative embodiment, shown in FIG. 3, the controlling means 8 comprises a control unit 11 for controlling the amplifying means 7, and storage means or memory 12. According to the embodiment of FIG. 3, N samples are extracted from the signal selected as mean or most typical signal (where N is equal to or less than the number of photosensitive elements of sensor 3). These samples are converted into binary values and, after having created their reciprocal, they are stored in the storage means 12. The stored values are sequentially retrieved from storage means 12 in synchrony with the scan of the optical code (through a synchronizer or timer 13 suitably provided in control unit 11). Through a digital/analogue converter (DAC) 14 (also provided in the control unit 11), the gain of the amplifying means 7 is controlled at each scan through the control. signal 9, thus generating a resulting electrical signal 6 having a substantially constant amplitude.

According to another compensation criteria devised by the inventors for the purpose of guaranteeing a minimum difference between the pattern of the gain applied to the detected electrical signal 4 and the inverse of the amplitude pattern of said signal, instead of determining a single mean or most typical signal (as proposed in the previously described compensation criterion), a series of typical signals detected according to the methodology described above are determined (for example, at different reading distances or on the basis of the type of required application, etc.). The inverse pattern is determined for each signal in the series. A series of signals is thus obtained, representing a series of laws by which it is possible to vary the gain of the amplifying means 7 at each scan. This advantageously allows to increase the versatility of the reader, making more precise the intervention of varying the amplitude pattern of the electrical signal 4 detected by sensor 3.

From the structural point of view, this second criterion can also be implemented by various alternative embodiments of the controlling means 8 for the amplifying means 7.

Figure 7:
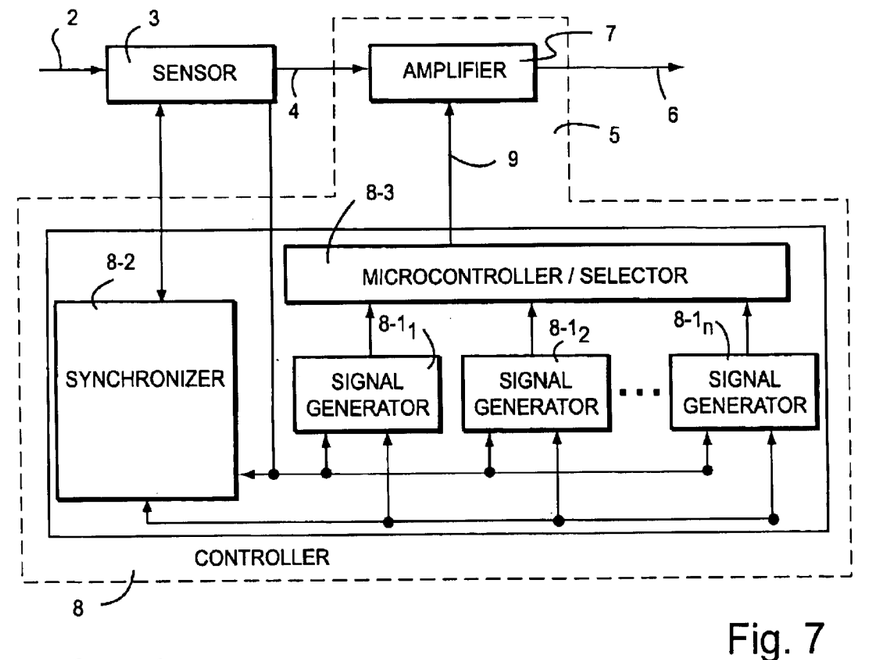

According to a first embodiment (shown in FIG. 7), the controlling means 8 comprises a plurality of signal generators 8-1₁ through 8-1ₙ synchronised (through suitable timers 8-2) with sensor 3. The number n of signal generators corresponds to the number of different interventions of varying the amplitude pattern of the electrical signal 4 to be carried out. A microcontroller 8-3 selects the suitable generator for the current scan, according to a suitable selection criterion.

Figure 8:
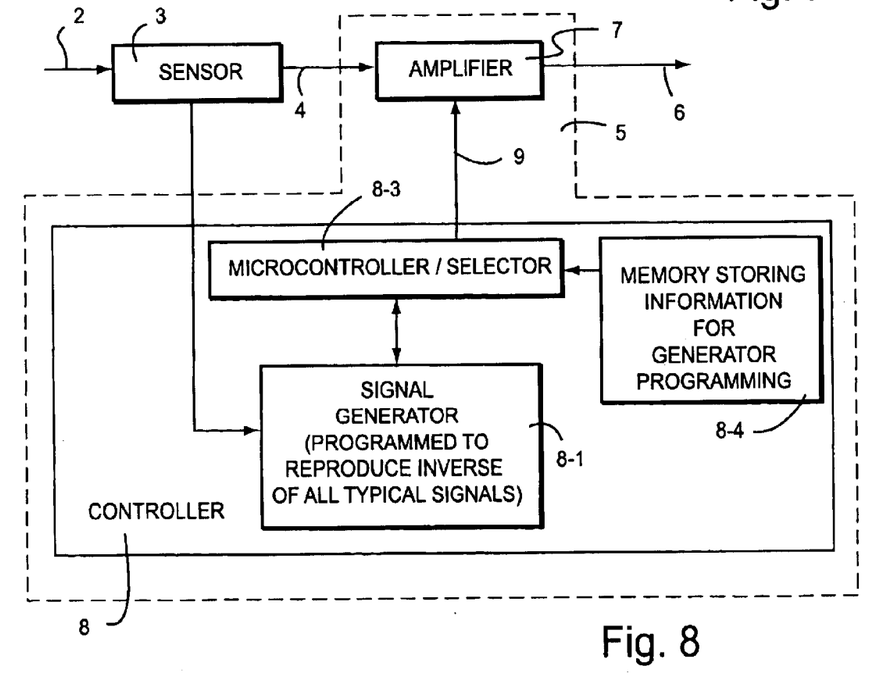

According to a second embodiment (shown in FIG. 8), the controlling means 8 comprises a single signal generator 8-1 which can be programmed by the microcontroller 8-3 so as to reproduce the inverse of all the typical signals considered. In this case, the information on the generator programming is stored in suitable storage means or memory 8-4.

Figure 9:
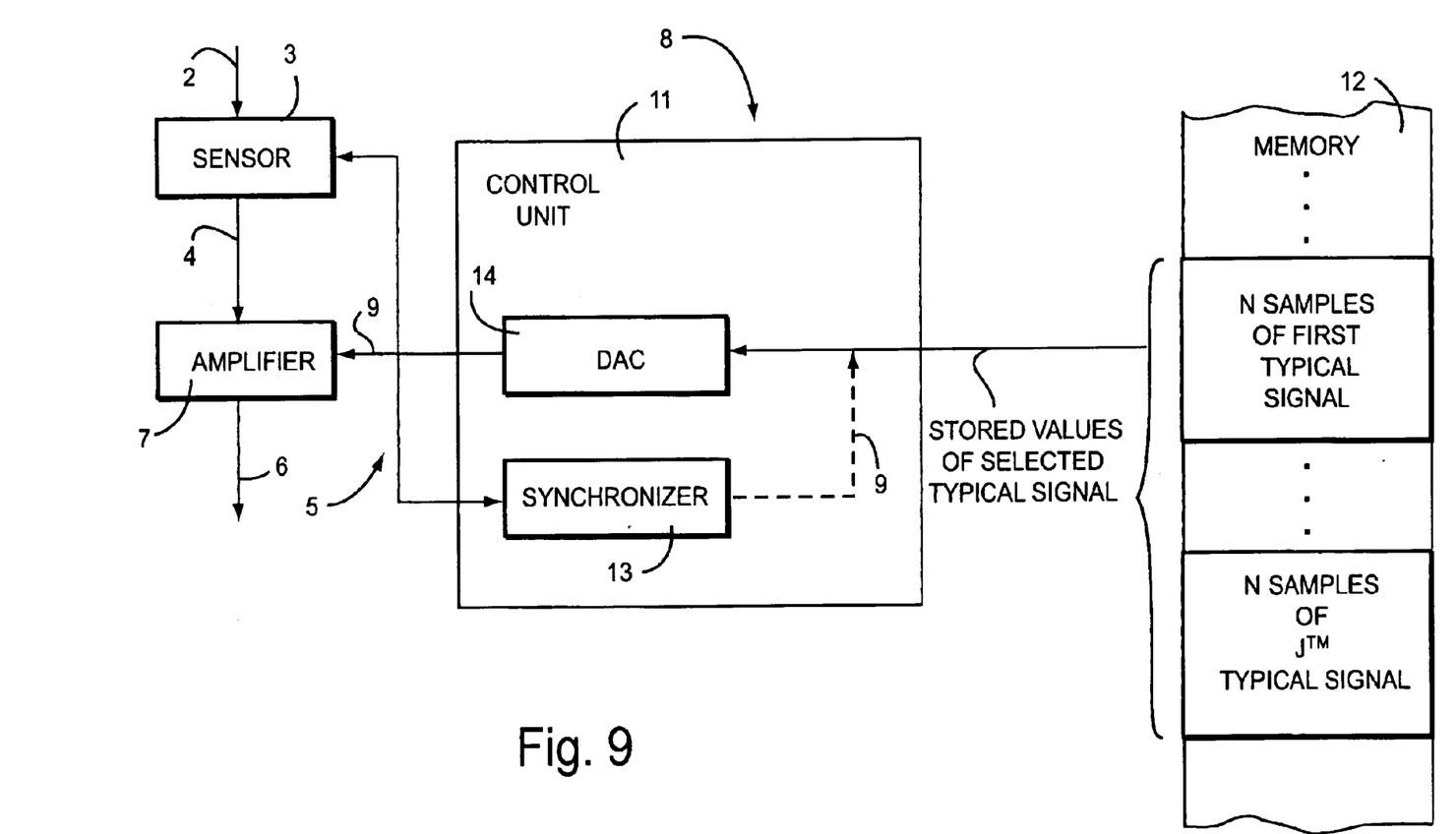

According to a third embodiment (shown in FIG. 9), the controlling means 8 comprises, also in this case, a control unit for controlling the amplifying means 7, and storage means or memory 12. According to the FIG. 9 embodiment, and in a manner totally analogous to what described above with reference to the second embodiment of the first compensation criterion (e.g., FIG. 3), N samples are extracted for each signal selected as typical signal (where N is equal to or less than the number of photosensitive elements of sensor 3). These samples are converted into binary values and, after having created their reciprocal, they are stored in the storage means 12. Then, one of the typical signals is selected depending on the specific application and, in synchrony with the optical code scan (through a synchroniser or timer suitably provided into the control unit), the stored values correlated to said selected signal are sequentially retrieved from the storage means. Then, through a digital/analogue converter (also provided into the control unit) the gain of the amplifying means 7 is controlled at each scan, thus generating a resulting electrical signal 6 having a substantially constant amplitude.

The selection of the suitable generator or of the suitable sequence of stored samples can be implemented according to various modes; some of them are described in the following description.

According to a first mode, through a software algorithm, a microprocessor selects in a sequence, or according to a predetermined criterion (for example, in order of typicality) the different signal generators, or all of the stored N samples, until the intervention of varying the amplitude pattern of the electrical signal 4 is such as to make the optical code decoding possible.

According to a second mode, through a conventional system for detecting the distance between reader and optical code and a suitable correspondence law (determined in advance) between the distance and the typical signal pattern, a microprocessor selects the suitable generator. If the system for selecting the distance is sufficiently accurate to provide also an estimate of the inclination, on the horizontal plane, of the optical code with respect to the reader (pitch angle), then the intervention of varying the amplitude pattern of the electrical signal 4 can be even more precise, as in this case it is possible to also consider, in the step of determination of the typical signals and in that of attenuation of the gain variation, the non-uniformities of the pattern of the luminous profile of the light beam diffused by the illuminated code due to the misalignment between code and reader.

According to another of the compensation criterion devised by the inventors for the purpose of guaranteeing a minimum difference between the gain pattern applied to the detected electrical signal 4 and the inverse of the amplitude pattern of said signal, a plurality of consecutive detections are carried out, each time amplifying the detected electrical signal by applying thereto a gain variable according to an inverse variation law with respect to that of the previously detected signal. More particularly, at each scan of the optical code, a microprocessor acquires the electrical signal 4 in output from sensor 3 through a suitable A/D converter, and determines its variation law (envelope) through a low-pass filtering or an interpolation of the detected minimum local values. Then, the inverse function of said variation law is calculated and applied to the next scan, by controlling—through a D/A converter—the variable gain amplifying means.

An example of algorithm for determining the variation law (envelope) of the electrical signal 4 in output from sensor 3 comprises the following steps:

dividing the image of the electrical signal 4 into a plurality of sections;

for each section, identifying a relative minimum point;

interpolating the identified minimum points (for example, with a least squares interpolation).

Figure 4:
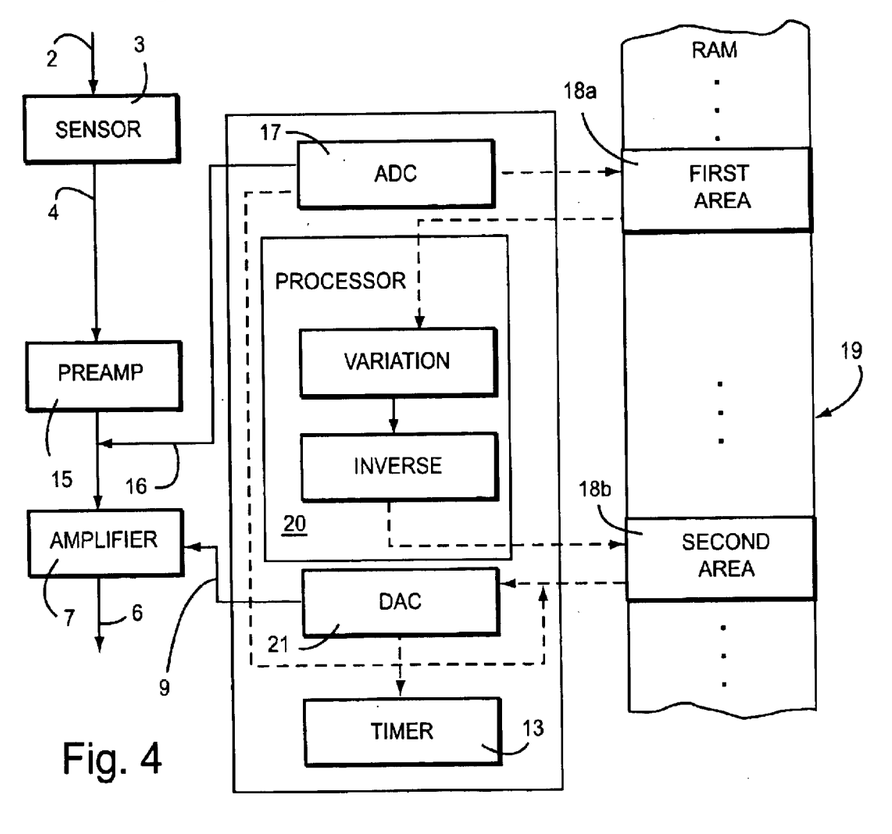
FIGS. 4–FIG. 9 show block diagrams of other embodiments of a portion of a reading device according to the present invention, including the device of FIG. 2.

From the structural point of view, also this third criterion can be implemented by various alternative embodiments of the controlling means 8 and of the amplifying means 7. One of such embodiments is shown in FIG. 4.

According to this embodiment, the electrical signal 4 detected by sensor 3 is pre-amplified through a first amplifier 15 so as to facilitate its conversion. The pre-amplified signal 16 is sampled through an A/D converter 17 and the extracted samples are stored in a first area 18a of a storage card 19 (RAM). Then, the sampled signal is processed by a suitable software in a processing block 20 so as to determine its variation law (envelope) and determine its inverse. The samples of said inverse function are stored in a second area 18b of the storage card 19 ready to be used at the next scans to control the variable gain. stage of the amplifying means 7. In particular, the samples of the inverse function are taken from area 18b and transferred to a D/A converter 21 which provides the control signal 9 of the gain of the amplifying means 7. The synchronism of the transfers to the D/A converter 21 and of the sampling of the A/D converter 17 is ensured by a timer 13.

Of course, this third criterion is more powerful and valid than the ones previously described. In fact, it also accommodates the actual non-uniformities that are difficult to foresee in advance, such as (for example) those caused by the difference of emission between the luminous sources, although they are nominally equal to each other.

Independently of the implemented compensation criterion and/or of the implemented embodiment, it is convenient to limit the maximum operating gain of the variable amplifier 7 so as to contain the noise, optionally using more variable amplification steps arranged in a cascade and uncoupled from dedicated filtering steps. Moreover, it is preferable that the gain variation be continuous, for the purpose of preventing that sudden variations produced on the resulting signal 6 could alter the extraction of its information content. In fact, it must be considered that the electrical signal 4 as output from sensor 3 is typically constant at intervals: that is to say, N discrete values of tension follow on time, due to the transduction process operated by each of the N photosensitive elements of sensor 3.

Figure 5:
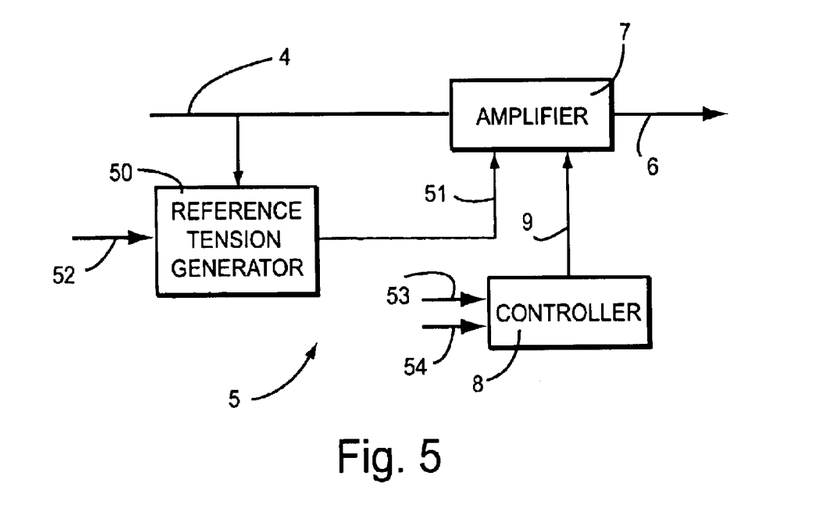

FIG. 5 schematically shows another embodiment of means 5 for varying the amplitude pattern of the electrical signal 4 detected by sensor 3. In the FIG. 5 embodiment, besides the amplifying means 7 and the controlling means 8, means 5 comprises a generator 50 of a reference tension 51 necessary for the amplifying means 7. The reference tension 51 is obtained through a classic sampling circuit from the electrical signal 4 in output from the sensor, starting from a tension 52 which represents the level of the "absolute black" of the electrical signal 4 (obtained by optically screening some particular pixels). Signal 9 for controlling the variable gain amplifying means 7 is obtained through a ramp generator 8 controlled by a signal 53 which, besides synchronising the ramp generator 8, determines the pattern, along the reading direction, of the resulting signal 6, and through a signal 54, which determines the variation on time of said signal 6. By doing so, the symmetry of the resulting signal 6 with respect to the optical axis of the sensor and its temporal pattern is obtained. Finally, the resulting signal 6 can be softened thanks to the logarithmic behaviour of a diode and resistance network.

In operation, the illumination system of the reader of the present invention illuminates the optical code to be read, and the reception system picks-up the luminous signal diffused by the illuminated code. The signal is detected by sensor 3, which generates the electrical signal 4 (proportional to the luminous signal) having (for example) amplitude variable, along the reading direction, between a maximum value Vmax and a minimum value Vmin. The electrical signal 4 is then amplified by applying thereto a gain variable according to a predetermined variation law, for example and preferably, a variation law which is substantially inverse with respect to that of the same electrical signal 4 (according to one of the compensation criteria described above), so as to generate a resulting electrical signal 6 having a predetermined amplitude pattern, for example and preferably, a constant amplitude. The electrical signal 6 is then processed and decoded so as to extract the coded information content.

The present description has been made with particular reference to the case in which, starting from an electrical signal with variable amplitude (typically, the electrical signal detected by a sensor in a coded information optical reader), a signal with substantially constant amplitude is to be obtained. However, it is evident that the present invention must not be regarded as limited to said specific case, but it must be extended to all cases in which an electrical signal having variable amplitude according to any predetermined pattern is to be obtained. For example, the present invention comprises the case in which, starting from a detected electrical signal having a constant amplitude pattern or an amplitude pattern variable according to a first variation law (for example, with greater amplitude at the centre), an electrical signal having an amplitude pattern variable according to a second variation law is to be obtained (for example, with greater amplitude at the ends), etc.

What is claimed is:

1. A device for reading coded information, comprising:
   illumination means;
   means for picking-up a luminous signal diffused by an illuminated support containing coded information;
   means for detecting the luminous signal and for generating a first electrical signal proportional to said luminous signal;
   means for processing said first electrical signal to extract the coded information;
   wherein the device comprises means for varying an amplitude pattern of said first electrical signal along at least one reading direction, so as to generate a modified first electrical signal having, along said at least one reading direction, a predetermined amplitude pattern, said modified first electrical signal being processed to extract the coded information.

2. A device according to claim 1, wherein the means for detecting the luminous signal generates the first electrical signal proportional to said luminous signal and having an amplitude pattern variable along said at least one reading direction, between at least one maximum value Vmax and at least one minimum value Vmin, and the means for varying the amplitude pattern of said first electrical signal along said at least one reading direction causes the modified first electrical signal to have a substantially constant amplitude pattern.

3. A device according to claim 1, wherein the means for varying the amplitude pattern of said first electrical signal operates on said first electrical signal point by point.

4. A device according to claim 1, wherein the illumination means comprises at least one array of LEDs.

5. A device according to claim 1, wherein the means for detecting the luminous signal comprises at least one array of photosensitive elements aligned along said at least one reading direction.

6. A device according to claim 5, wherein the detection means comprises a linear or matrix CCD or C-MOS sensor.

7. A device according to claim 1, wherein the means for varying the amplitude pattern of said first electrical signal comprises amplifying means with a gain variable according to a predetermined variation law.

8. A device for reading coded information, comprising:
   illumination means;
   means for picking-up a luminous signal diffused by an illuminated support containing coded information;
   means for detecting the luminous signal and for generating a first electrical signal proportional to said luminous signal;
   means for processing said first electrical signal to extract the coded information;
   wherein the device comprises means for varying an amplitude pattern of said first electrical signal along at least one reading direction, so as to generate a modified first electrical signal having, along said at least one reading direction, a predetermined amplitude pattern;
   wherein the means for varying the amplitude pattern of said first electrical signal comprises amplifying means with a gain variable according to a predetermined variation law which is substantially inverse with respect to a variation law of said first electrical signal.

9. A device according to claim 7, wherein the variable gain amplifying means applies:
   (1) a gain Gmin with a value equal to 1 to points of said first electrical signal having maximum amplitude Vmax; and
   (2) a gain Gmax with a value equal to Vmax/Vmin to points of said first electrical signal having minimum amplitude Vmin.

10. A device according to claim 7, further comprising means for controlling said variable gain amplifying means.

11. A device for reading coded information, comprising:
    illumination means;
    means for picking-up a luminous signal diffused by an illuminated support containing coded information;
    means for detecting the luminous signal and for generating a first electrical signal proportional to said luminous signal;
    means for processing said first electrical signal to extract the coded information;
    wherein the device comprises means for varying an amplitude pattern of said first electrical signal along at least one reading direction, so as to generate a modified first electrical signal having, along said at least one reading direction, a predetermined amplitude pattern;

wherein the means for varying the amplitude pattern of said first electrical signal comprises amplifying means with a gain variable according to a predetermined variation law;

further comprising means for controlling said variable gain amplifying means, said controlling means comprising:
means for generating at least one second electrical signal variable according to an inverse variation law with respect to that of at least one third electrical signal, the at least one third electrical signal being representative of a luminous signal diffused by a reference target placed on at least one predetermined distance;
means for synchronizing said at least one second electrical signal with said first electrical signal.

12. A device according to claim 11, wherein said reference target is a white-colored plane support.

13. A device according to claim 11, wherein said at least one third signal is a signal representative of the mean of the electrical signals detected when placing the reference target at different distances.

14. A device for detecting a luminous signal diffused by a support containing coded information, the device comprising:
photo-receiving means which generates a first electrical signal proportional to a luminous signal diffused by a support containing coded information,
means for varying an amplitude pattern of said first electrical signal, along at least one reading direction, so as to generate a modified first electrical signal having, along said at least one reading direction, a predetermined amplitude pattern.

15. A method for reading coded information, comprising the following steps:
illuminating a support containing coded information;
picking-up a luminous signal diffused by said illuminated support;
detecting said luminous signal so as to generate a first electrical signal proportional to said luminous signal;
processing said first electrical signal so as to extract the coded information;
varying an amplitude pattern of said first electrical signal along at least one reading direction, so as to generate a modified first electrical signal having, along said at least one reading direction, a predetermined amplitude pattern, said modified first electrical signal being processed to extract the coded information.

16. The method according to claim 15, wherein said first electrical signal has an amplitude pattern variable, along said at least one reading direction, between at least one maximum value Vmax and at least one minimum value Vmin, and further comprising varying the amplitude pattern of said first electrical signal along said at least one reading direction to generate the modified first electrical signal with a substantially constant amplitude pattern.

17. The method according to claim 15, wherein the step of varying the amplitude pattern of said first electrical signal occurs point by point.

18. The method according to claim 15, wherein the step of varying the amplitude pattern of said first electrical signal comprises the step of amplifying said first electrical signal by applying thereto a gain variable according to a predetermined variation law.

19. A method for reading coded information, comprising the following steps:
illuminating a support containing coded information;
picking-up a luminous signal diffused by said illuminated support;
detecting said luminous signal so as to generate a first electrical signal proportional to said luminous signal;
processing said first electrical signal so as to extract the coded information;
varying an amplitude pattern of said first electrical signal along at least one reading direction, so as to generate a modified first electrical signal having, along said at least one reading direction, a predetermined amplitude pattern;
wherein the step of varying the amplitude pattern of said first electrical signal comprises the step of amplifying said first electrical signal by applying thereto a gain variable according to a predetermined variation law which is substantially inverse with respect to a variation law of said first electrical signal.

20. The method according to claim 18, wherein the step of amplifying said first electrical signal comprises the steps of:
applying a gain Gmin with a value equal to 1 to points of said first electrical signal having maximum amplitude Vmax; and
applying a gain Gmax with a value equal to Vmax/Vmin to points of said first electrical signal having minimum amplitude Vmin.

21. A method for reading coded information, comprising the following steps:
illuminating a support containing coded information;
picking-up a luminous signal diffused by said illuminated support;
detecting said luminous signal so as to generate a first electrical signal proportional to said luminous signal;
processing said first electrical signal so as to extract the coded information;
varying an amplitude pattern of said first electrical signal along at least one reading direction, so as to generate a modified first electrical signal having, along said at least one reading direction, a predetermined amplitude pattern;
wherein the step of varying the amplitude pattern of said first electrical signal comprises the step of amplifying said first electrical signal by applying thereto a gain variable according to a predetermined variation law;
wherein the step of amplifying said first electrical signal comprises the following steps:
generating at least one second electrical signal variable according to an inverse variation law with respect to that of at least one third electrical signal representative of at least one luminous signal diffused by a reference target placed on at least one predetermined distance;
synchronizing said at least one second electrical signal with said first electrical signal; and
adjusting said gain depending on said at least one second electrical signal.

22. The method according to claim 21, wherein the step of generating said at least one second electrical signal comprises the following steps:
detecting a third electrical signal representative of a luminous signal diffused by an illuminated reference target placed at a predetermined distance;

repeating the previous step for a predetermined number of times, each time varying the distance at which the reference target is placed;

determining at least one fourth electrical signal representative of the electrical signals detected by placing the reference target at different distances;

determining at least one second electrical signal having an inverse variation law with respect to that of said at least one fourth electrical signal.

23. The method according to claim 21, wherein said reference target is a white-colored plane support.

24. A method for reading coded information, comprising the following steps:

illuminating a support containing coded information;

picking-up a luminous signal diffused by said illuminated support;

detecting said luminous signal so as to generate a first electrical signal proportional to said luminous signal;

processing said first electrical signal so as to extract the coded information;

varying an amplitude pattern of said first electrical signal along at least one reading direction, so as to generate a modified first electrical signal having, along said at least one reading direction, a predetermined amplitude pattern;

wherein the step of varying the amplitude pattern of said first electrical signal comprises the step of amplifying said first electrical signal by applying thereto a gain variable according to a predetermined variation law;

further comprising the steps of carrying out a plurality of consecutive detections, each time amplifying the detected electrical signal by applying thereto a gain variable according to an inverse variation law with respect to that of the previously detected signal.

25. An apparatus for reading coded information, the apparatus comprising:

a reader which detects a luminous signal diffused by an illuminated support bearing coded information and which generates a first electrical signal related to the luminous signal;

a processor which varies an amplitude pattern of the first electrical signal along at least one reading direction so as to generate a modified first electrical signal having, along the at least one reading direction, a predetermined amplitude pattern.

26. The apparatus of claim 25, wherein the first electrical signal has an amplitude pattern which is variable between at least one maximum value Vmax and at least one minimum value Vmin, and wherein the processor varies the amplitude pattern of the first electrical signal so that the modified first electrical signal has a substantially constant amplitude pattern.

27. The apparatus of claim 25, wherein the processor comprises an amplifier which has a gain, the gain being variable according to a predetermined variation law.

28. The apparatus of claim 27, wherein the predetermined variation law of the amplifier is substantially inverse with respect to a variation law of the first electrical signal.

29. The apparatus of claim 27, where in the amplifier applies:

(1) a gain Gmin with a value equal to 1 to points of said first electrical signal having maximum amplitude Vmax; and (2) a gain Gmax with a value equal to Vmax/Vmin to points of said first electrical signal having minimum amplitude Vmin.

30. The apparatus of claim 27, wherein the processor further comprises a controller which controls the gain of the amplifier.

31. The apparatus of claim 30, wherein the controller comprises:

a signal generator which generates at least a second electrical signal in accordance with an inverse variation law with respect to a third electrical signal, the third electrical signal being representative of a luminous signal diffused by a reference target placed at a predetermined distance;

a synchronizer which synchronizes the second electrical signal with the first electrical signal.

32. The apparatus of claim 31, wherein the third electrical signal is representative of a mean of plural electrical signals, each of the plural electrical signals being detected when the reference target is placed at corresponding plural differing distances.

* * * * *